March 1, 1927.
F. M. LEWIS
DIFFERENTIAL MECHANISM
Filed May 11, 1925
1,619,141
3 Sheets-Sheet 1
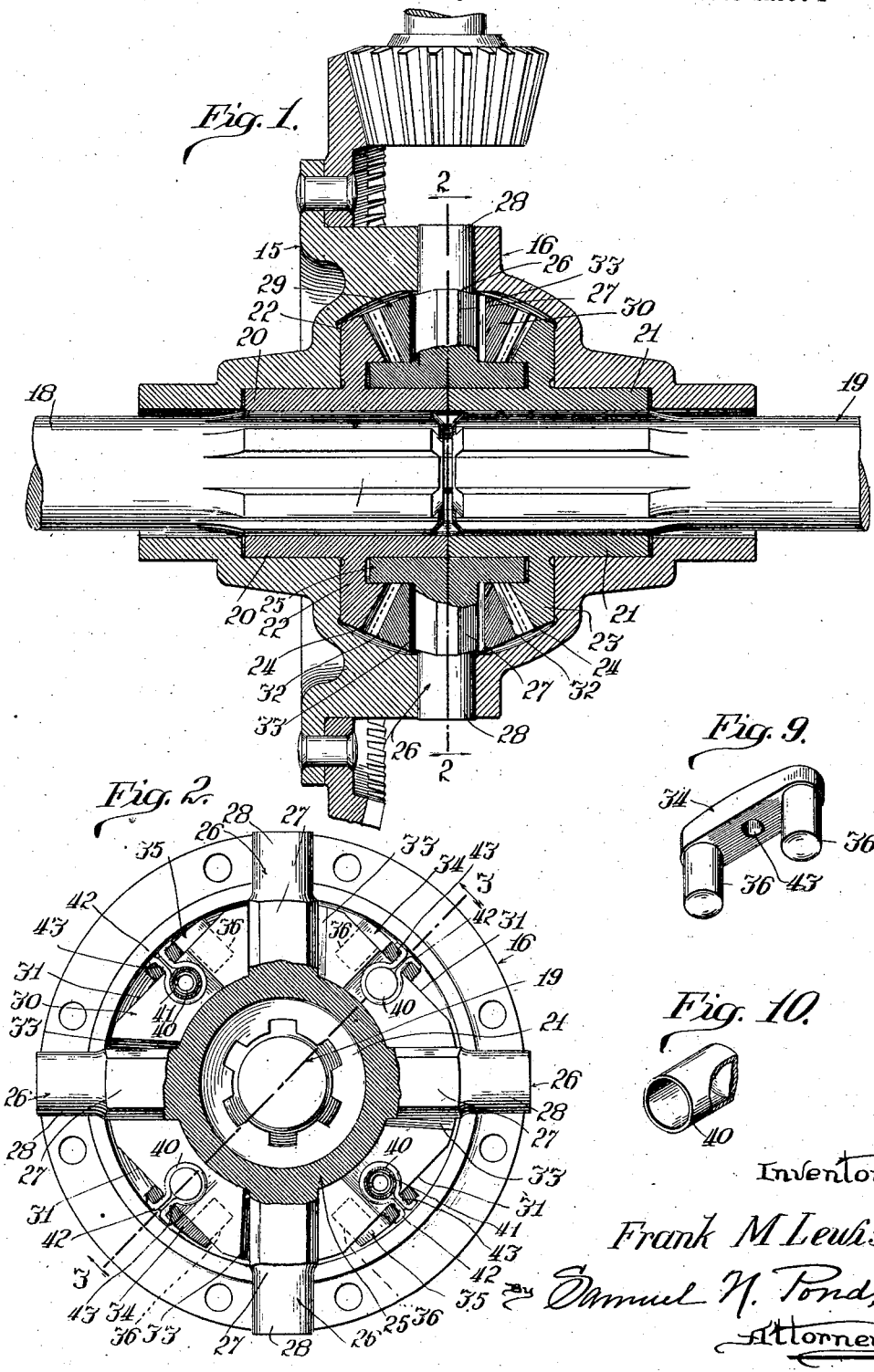
Inventor:
Frank M Lewis,
by Samuel N. Pond,
Attorney.

March 1, 1927.  
F. M. LEWIS  
DIFFERENTIAL MECHANISM  
Filed May 11, 1925  
1,619,141  
3 Sheets-Sheet 2
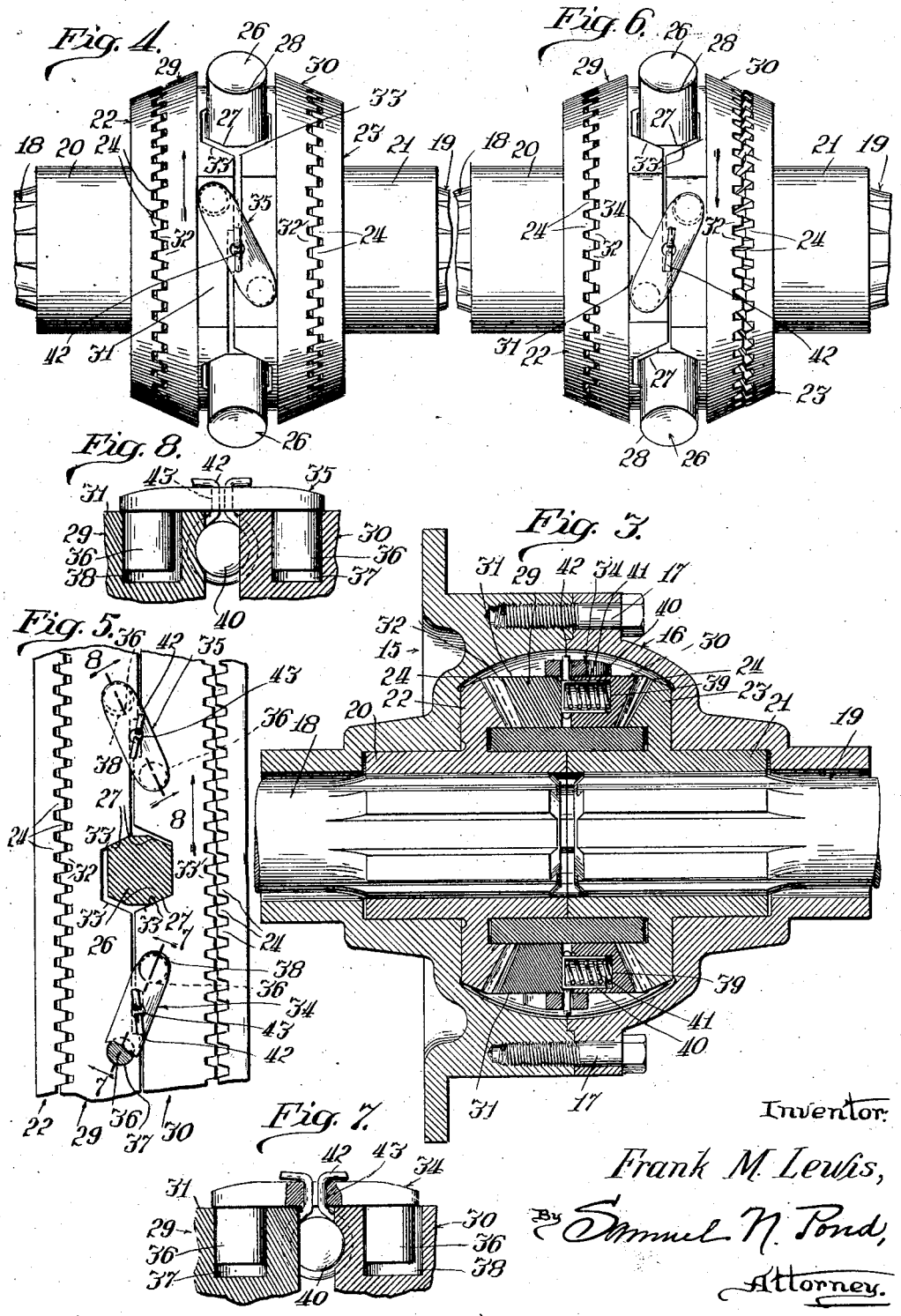
Inventor:  
Frank M. Lewis,  
By Samuel N. Pond,  
Attorney.

March 1, 1927.
F. M. LEWIS
1,619,141
DIFFERENTIAL MECHANISM
Filed May 11, 1925  3 Sheets-Sheet 3
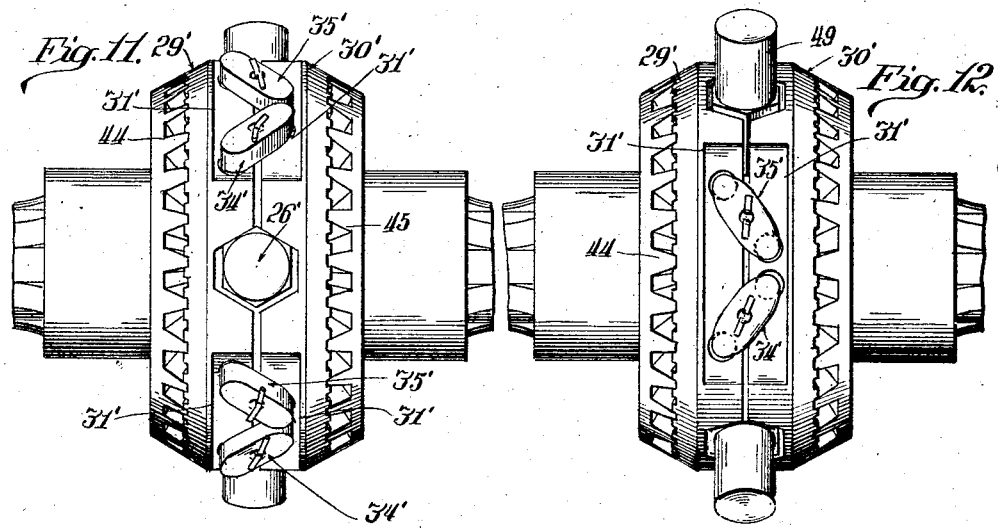
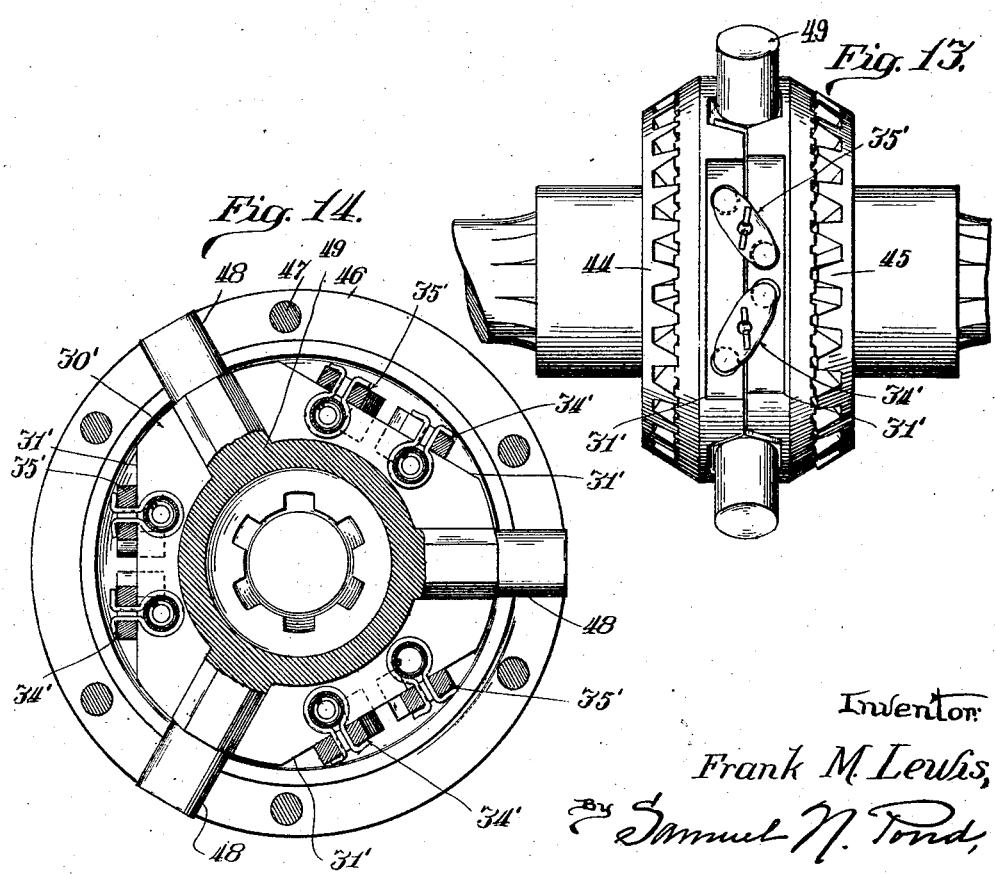
Inventor
Frank M. Lewis,
By Samuel N. Pond,
Attorney.

Patented Mar. 1, 1927.

1,619,141

UNITED STATES PATENT OFFICE.

FRANK M. LEWIS, OF CHICAGO, ILLINOIS.

DIFFERENTIAL MECHANISM.

Application filed May 11, 1925. Serial No. 29,275.

This invention relates to differential mechanism designed mainly, but not exclusively, for use on automobiles, trucks, and other motor vehicles, and has reference more particularly to a mechanism of the general type disclosed in former Letters Patent of the United States heretofore granted to me No. 1,292,818, dated January 28, 1919 and No. 1,430,744 dated October 3, 1922, and characterized by the provision of a pair of driven clutch members fast on the inner ends of the axle sections, a pair of laterally shiftable driving clutch members between said driven clutch members, a rotatable housing enclosing said driving and driven clutch members, and a driver having the general form of a spider mounted in said rotatable housing and having radial studs in driving engagement with the inner sides of said shiftable clutch members.

In one known form of differential mechanism of this general type, exemplified in Letters Patent to Manifold No. 1,240,748, September 18, 1917 and to Cartwright No. 1,477,310, December 11, 1923, the two laterally shiftable driving clutch members are connected by a plurality of pivoted links located between adjacent spider arms of the driver and under normal driving conditions lying parallel with the axle. When one of the wheels overruns the other, as for instance the outer wheel in turning the corner or traveling on a curved path, the driven clutch member pertaining to such faster running wheel tends to drive its co-operating driving clutch member at a greater speed than that of the driving clutch member on the other side; and this swings the links to a position more or less inclined to the axle, placing said links under tension, and the pull of the latter then draws the driving clutch member of the overrunning wheel out of clutch engagement with its co-operating driven clutch member, permitting the overrunning wheel to then turn freely.

In the known constructions of this type, however, a single pair, or two pairs, of links have been employed for disengaging the driving clutch member of the overrunning wheel in both directions of rotation of the latter; in other words, in both forward and backward driving. This necessitates an arrangement of the links wherein during normal forward or rearward driving, when both driving clutch members are engaged, the links lie substantially parallel with the axle. This involves a very considerable swinging movement of the links in order to effect disengagement, since, manifestly, as the link swings from a position parallel to the axle toward a position at right angles to the latter the inward travel of the swinging end of the link is at first very slight, and increases to its maximum as it approaches the right angle position.

One object of my present invention is to provide an improved differential mechanism of the last referred to type wherein, however, a separation of the driving and driven clutch members of the overrunning wheel may be equally effected through a comparatively small swinging movement of the links. To do this, I employ two sets of links, one for disengaging the right hand clutch during forward travel and the left hand clutch during backward travel, and the other for disengaging the left hand clutch during forward travel and the right hand clutch during backward travel; and these links are so disposed that when both clutches are engaged, they lie at large angles to the axis of the axle; and in order that, when one set of links is operative, the other set may not interfere with the operation, I mount at least one pivot stud of each link in a bearing in the driving clutch member which affords sufficient lost motion to enable the idle set of links to conform to, and avoid interference with, the action of the active set of links.

Another object of my invention is to provide, in association with the improved link arrangement above referred to, an arrangement of driving and driven clutch members such that when the driving clutch members are fully engaged with their respective driven clutch members, the space between them will be the minimum required to effect complete separation of one only of the driving clutch members at a time from its co-operating driven clutch member, whereby it is possible to set the links at an angle such that a very slight swing of the links effects such separation.

Another practical essential in differentials of this type is that the driven clutch members shall be so mounted that they cannot, under any conditions encountered in service, become displaced toward each other, since this would manifestly interfere with the proper functioning of the driving clutch members to free the driven clutch members during the overrunning travel of the latter. This requisite I secure by providing a construction wherein either the inner ends of the axle sections on which the driven clutch members are fixedly keyed, or the inner ends of the hubs of the driven clutch members, or both, are in actual opposing contact, or the hub of the driving spider serves to space the driven clutch members.

Other objects and attendant advantages of the invention will be apparent to persons skilled in the art as the same becomes better understood by reference to the following description, taken in connection with the accompanying drawings wherein I have illustrated two practical forms and applications of the principle of the invention, and in which—

Fig. 1 is an axial section of my improved differential mechanism;

Fig. 2 is a central transverse section through the same on the line 2—2 of Fig. 1;

Fig. 3 is also an axial section taken in a different plane from that of Fig. 1, on the line 3—3 of Fig. 2;

Fig. 4 is an elevation of the same, with the rotatable housing omitted, showing the parts in normal running position wherein both axle sections are driven, the direction of drive being indicated by arrows;

Fig. 5 is a view similar to Fig. 4, but showing the relative positions of the parts when the right hand axle is running at a greater speed than the left hand axle, and the right hand driving clutch member has been disengaged;

Fig. 6 is a view similar to Figs. 4 and 5, showing the right hand clutch member disengaged when running in the opposite direction to that indicated in Figs. 4 and 5;

Figs. 7 and 8 are enlarged longitudinal sections through the links and their bearings taken on the lines 7—7 and 8—8 respectively of Fig. 5;

Fig. 9 is a perspective detail of one of the links;

Fig. 10 is a perspective detail of a spring housing;

Figs. 11 and 12 are views similar to Fig. 4, showing an application of the invention to the three-arm spider and axle gears of the Ford type; the parts appearing in normal running position in both views;

Fig. 13 is a view similar to Fig. 12, but showing the relative positions of the parts when the right hand axle is overrunning the left hand axle; and Fig. 14 is a central transverse section on the line 14—14 of Fig. 11.

Referring to the drawings, and describing first the form of the invention illustrated in Figs. 1 to 10 inclusive, 15 and 16 designate co-operating halves of a rotatable housing, united by machine screws 17 (Fig. 3) and enclosing the principal co-operating parts of the differential gear. Into the opposite ends of this housing are entered the two axle sections 18 and 19, on which are keyed the hubs 20 and 21 of a pair of outer driven clutch members 22 and 23, which latter are formed on their inner sides with radial clutch teeth 24. In the construction shown the outer ends of the hubs 20 and 21 constitute bearings for the rotatable housing. In lieu of the plain bearings herein shown merely for purposes of illustration, the customary roller bearings may, of course, be employed. By reference to Fig. 1 it will be observed that the inner ends of the shafts 18 and 19 and also the inner ends of the hubs 20 and 21 meet in direct contact with each other.

On the inner meeting portions of the hubs 20 and 21 is rotatably mounted the relatively long hub 25 of a driver spider, the hub 25 co-operating with the outer end bearings of the hubs 20 and 21 to maintain the latter in accurate axial alinement. In the construction shown in Figs. 1 and 2 the driver spider has four radial arms ninety degrees apart, each arm comprising an inner squared portion 26 formed with beveled corners 27 constituting cams, and an outer round portion 28, which latter, as clearly shown in Figs. 1 and 2, is rigidly mounted in and between the mating sections 15 and 16 of the rotatable housing.

Between the driver spider and the driven clutch members 22 and 23 are located a pair of driving clutch members 29 and 30. Each of these members takes the form of an annulus, the inner periphery of which has a running and sliding fit on the hub 25 of the spider. The outer periphery is flattened between adjacent spokes of the spider, as shown at 31 in Fig 2 to provide space and seats for the links hereinafter described. On the outer side of each of these driving clutch members 29 and 30 is a ring of radial clutch teeth 32 adapted to interfit and co-operate with the clutch teeth 24 of the driven members 22 and 23. On the inner side of the shiftable clutch members 29 and 30 are formed radial recesses having inclined sides 33, clearly shown in Fig. 5; the inclination of the sides 33 corresponding to that of the bevels or cams 27 on the spider arms or spokes 26. As clearly shown in Figs. 1, 4 and 5, the mating recesses on the two shiftable members embrace the inner squared portions of the arms of the spider, with a limited amount of both longitudinal and lateral clearance. By reference to Figs. 5 and 6 it will be observed that the thickness of the two shiftable clutch members 29 and 30 is such that their inner edges will come into contact with each other before both of said members can be simultaneously disengaged from their respective driven clutch members 22 and 23. In other words, both clutch members cannot simultaneously be disengaged or unclutched.

Pivotally connecting diametrically opposite flattened peripheral portions 31 of the two driving clutch members 29 and 30 are a pair of links 34; and similarly connecting the intermediate diametrically opposite flattened peripheral portions 31 are another pair of links 35. The links 34 and 35 are all alike, and, by reference to Fig. 9 it will be observed that each link is formed on its ends with a pair of round studs 36 disposed at a right angle to the body of the link, which studs are entered in sockets 37 and 38 formed in the driving clutch members 29 and 30. All of these links are disposed at a steep angle to the axis of the axle; and it will be observed by reference to Fig. 5 that the links 34 and 35 are oppositely inclined. It will also be seen by reference to Figs. 7 and 8 that, in the case of each link, one of the sockets, such as 37, is round and affords only a turning fit to the stud 36 of the link, while the other socket, such as 38, is slightly oblong in the direction of the link, and permits a small amount of play of the stud 36 therein. At the overrunning of the right hand wheel in a forward direction, such as is indicated in Fig. 5, the links 34 are active to retract the driving clutch member 30 from the driven clutch member 23 and the links 35 are idle. At the overrunning of the right hand wheel in a rearward direction, the links 35 are active and the links 34 idle. At the overrunning of the left hand wheel in a forward direction the links 35 are active and the links 34 idle, and at the overrunning of the left hand wheel in a rearward direction the links 34 are active and the links 35 are idle. In all of these cases, the slightly elongated socket 38 permits the necessary swinging movement of the idle links to permit, and not interfere with, the inward or separating movement of the driving clutch member on the side on which the overrunning occurs.

In the inner face of one of the driving clutch members 29 and 30 (the member 30 as herein shown) are formed a group of holes or sockets 39 (Fig. 3) in which are slidably mounted thimbles 40, one of which is shown in isolated detail in Fig. 10; and within these thimbles are coil compression springs 41 that abut at one end against the bottoms of the sockets 39 and at their other ends against the bottoms of the thimbles 40, pressing the latter against the opposed face of the other driving clutch member. These springs serve to start and urge the driving clutch members 29 and 30 apart and into driving engagement with their co-operating driven clutch members 22 and 23. During normal running in a forward or rearward direction, when both driving clutch members are engaged with their respective driven clutch members, the thrust of the cams 27 of the spider arms on the inclined sides 33 of the recesses in the shiftable clutch members acts to press said shiftable clutch members outwardly, and maintain them in clutch engagement with said driven members.

Cotter pins 42 formed with round heads encircling the projecting ends of the thimbles 40 extend through central holes 43 in the links 34 and 35 and serve to hold the latter in place without interferring with the free swinging movement of said links.

The exact degree of inclination of the links 34 and 35 to the axis of the axle is not essential, but preferably said links are inclined at an angle somewhat greater than forty-five degrees; and I have found in practice that the most satisfactory results are secured when the links are disposed at an angle such that the longitudinal median axis of the link is substantially normal to the inclined surfaces 27 and 33 of the spider arm and recess of the driving clutch member which are separated during the inward swing of the active link. Manifestly, the clearance afforded by the slightly oblong socket 38 might be distributed through both sockets of each link, but, from a manufacturing viewpoint, it is more simply and economically provided in one socket only of the pair.

In Figures 11 to 14 inclusive I have illustrated an application of the principle of the invention to a known form of standard differential employing a driving spider having three arms or spokes disposed one hundred and twenty degrees apart, such as the Ford. In these views 44 and 45 designate the regular standard rear axle bevel gears employed with the standard differential, this latter including a divided differential housing, one member of which is shown at 46 in Fig. 14 united by screws 47, attached to and driven by the differential master gear (not shown). This differential housing 46 is formed with three radial seats 48 which, in the standard construction, constitute bearings for the stems or spindles of the differential pinions. For the regular differential spider and pinions I substitute the three-arm spider designated as an entirety by 49; this member being similar in all respects to the four-arm spider previously described and shown in Figs. 1 and 2, except that it is formed with three arms one hundred and twenty degrees apart instead of four arms ninety degrees apart. Co-operating with this spider are the laterally shiftable driving clutch members 29' and 30' formed with three peripherally flattened portions 31' which, since they are formed on one hundred and twenty degree sectors, may be of greater length than the corresponding flattened portions 31 illustrated in Fig. 2. On each of these flattened portions 31' are mounted a pair of oppositely inclined links 34' and 35' that correspond functionally with the links 34 and 35 previously described and are mounted in the same manner upon and in the driving clutch members 29' and 30'. This construction, therefore, provides in a differential mechanism employing a three-arm spider, two independently acting sets of links for effecting the disengagement of the driving clutch members during overrunning of either wheel when traveling either in a forward or a rearward direction.

It is believed that the structural features, mode or principle of action, and practical advantages of the invention will be clear to persons skilled in the art from the foregoing description without further elaboration. It will be manifest that by providing two independently acting sets of links, one set functioning during overrunning of a wheel in one direction and the other during overrunning of the same wheel in the opposite direction it is possible to dispose these links at such an angle to the axis of the axle that but a very limited swinging movement of the link and a very limited relative rotary movement of the two driving clutch members are required to effect the disconnection of the driving clutch member from the driven clutch member, hence making it unnecessary to provide additional movement limiting devices between the two driving clutch members, the links themselves also performing this function. Hence it will be seen that my present invention provides angularly movable means connecting the two driving clutch members through the agency of which either of said driving clutch members is disengaged from its driven clutch member with a minimum of back-lash whenever the axle carrying the driven clutch member overruns the other axle in either direction. Moreover, the described structure lends itself to economy of structure and maintenance, since the manufacture of the links and the socketing of the driving clutch members to receive them is simple and of low cost, and said links are easily and cheaply replaced in case of breakage.

While I have herein shown and described certain practical and workable embodiments of the invention, it is manifest that the operative principle thereof might be embodied in other more or less specifically different forms; and hence I do not limit the invention to the particular embodiments herein disclosed, but reserve all such variations and modifications as fall within the spirit and purview of the appended claims.

I claim—

1. In a differential mechanism, the combination of a rotatable housing, axle sections entered within the opposite ends of said housing, driven clutch members fast on said axle sections, shiftable clutch members between said driven members, a driver connected to said housing and having portions thereof drivingly engaged with said shiftable members, means urging said shiftable members outwardly into clutch engagement with said driven members, angularly movable means connecting said shiftable members operating to effect disengagement of either of said shiftable members from its co-operating driven clutch member when one shiftable member overruns the other in one direction, and other angularly movable means connecting said shiftable members operating to effect disengagement of either of said shiftable members from its co-operating driven clutch member when one shiftable member overruns the other in the opposite direction.

2. In a differential mechanism, the combination of a rotatable housing, axle sections entered within the opposite ends of said housing, driven clutch members fast on said axle sections, shiftable clutch members between said driven members, a driver connected to said housing and having portions thereof drivingly engaged with said shiftable members, means urging said shiftable members outwardly into clutch engagement with said driven members, a set of links inclined in one direction to the axis of said axle sections pivotally connecting said shiftable members and operating to effect inward clutch disengaging movement of either of said shiftable members when one shiftable member overruns the other in one direction, and another set of links inclined in the opposite direction to the axis of said axle sections pivotally connecting said shiftable members and operating to effect inward clutch disengaging movement of either of said shiftable members when one shiftable member overruns the other in the opposite direction.

3. In a differential mechanism, the combination of a rotatable housing, axle sections entered within the opposite ends of said housing, driven clutch members fast on said axle sections, shiftable clutch members between said driven members, a driver connected to said housing and having portions thereof drivingly engaged with said shiftable members, means urging said shiftable members outwardly into clutch engagement with said driven members, a set of links inclined in one direction at an angle exceeding forty-five degrees to the axis of said axle sections pivotally connecting the peripheries of said shiftable members and operating to effect inward clutch disengaging movement of either of the latter when one shiftable member overruns the other in one direction, and another set of links inclined in the opposite direction at an angle exceeding forty-five degrees to the axis of said axle sections pivotally connecting the peripheries of said shiftable members, in alternating arrangement with said first-named set of links, and operating to effect inward clutch disengaging movement of either of said shiftable members when one shiftable member overruns the other in the opposite direction.

4. A specific embodiment of claim 3 wherein the links are formed with studs pivotally engaged with sockets in the shiftable clutch members, and the studs have sufficient lost motion in their sockets to permit idle inward swing of one set of links during active inward swing of the other set.

5. In combination with the mechanism defined in claim 4, means for locking the links on the peripheries of the shiftable clutch members with the studs of the links engaged with their respective sockets.

6. In a differential mechanism, the combination of a rotatable housing, axle sections entered within the opposite ends of said housing, driven clutch members fast on said axle sections, shiftable clutch members between said driven members formed with recesses in their adjacent sides, one of said shiftable clutch members being also formed with holes in its inner side, a spider connected to said housing having radial arms disposed within mating recesses of said shiftable members, apertured links pivotally connecting said shiftable members to each other and operating to effect a relative inward sliding movement of said shiftable members under a relative turning movement thereof, thimbles slidably mounted in said holes, compression springs in said thimbles acting to press the latter against the opposed face of the other shiftable clutch member, and cotter pins having eyes encircling said thimbles and legs passed through the apertures of said links and bent over the outer sides of the latter.

7. In a differential mechanism, the combination of a rotatable housing, axle sections entered within the opposite ends of said housing, driven clutch members fast on said axle sections, laterally slidable clutch members between said driven clutch members formed with mating recesses in their adjacent sides, the space between said driven clutch members being such that both of said laterally slidable clutch members cannot become simultaneously disengaged from said driven clutch members, a spider connected to said housing and having radial arms thereof disposed within mating recesses of said slidable members, means normally urging said slidable members outwardly into clutch engagement with said driven members, and a group of links inclined at an angle exceeding forty-five degrees to the axis of rotation of said axle sections pivotally connected to and spaced around the peripheries of said slidable members, whereby said links act to disengage said slidable members from their respective driven members under slight relative rotation of said slidable members.

8. A specific embodiment of claim 7 wherein means are provided for locking said driven clutch members against inward displacement toward each other.

9. In a differential mechanism, the combination of a rotatable housing, axle sections entered within the opposite ends of said housing, driven clutch members fast on said axle sections, laterally shiftable clutch members between said driven clutch members formed with mating recesses in their adjacent sides and with seats in their peripheries, a driver connected to said housing and having portions thereof disposed within the mating recesses of said shiftable members, compression springs between said shiftable members normally urging the latter outwardly into clutch engagement with said driven members, and a group of connecting links spaced around the peripheries of said shiftable members and each formed with end portions pivotally engaged with a pair of opposed seats in said shiftable clutch members, adjacent links being oppositely inclined to the axis of rotation of said axle sections.

10. In a differential mechanism, the combination of a rotatable housing, axle sections entered within the opposite ends of said housing, driven clutch members fast on said axle sections, laterally shiftable clutch members between said driven members formed with recesses in their adjacent sides, a driver connected to said housing and having radial studs disposed within mating recesses of said shiftable members, co-operating cam means on said driver and said shiftable members for forcing the latter outwardly, and maintaining them in clutch engagement with said driven members, springs between and normally urging said shiftable members towards said driven members, and two sets of connecting links grouped in alternating relation around the peripheries of said shiftable members and pivotally connecting the latter with capacity for a limited degree of lost motion, the links of the two groups being oppositely inclined to the axis of rotation of said axle sections and functioning under differential movements of said axle sections in opposite directions, respectively.

FRANK M. LEWIS.